Nov. 16, 1937.  C. E. BRADLEY ET AL  2,099,418
WATERPROOF BATHING SANDAL
Filed May 8, 1933
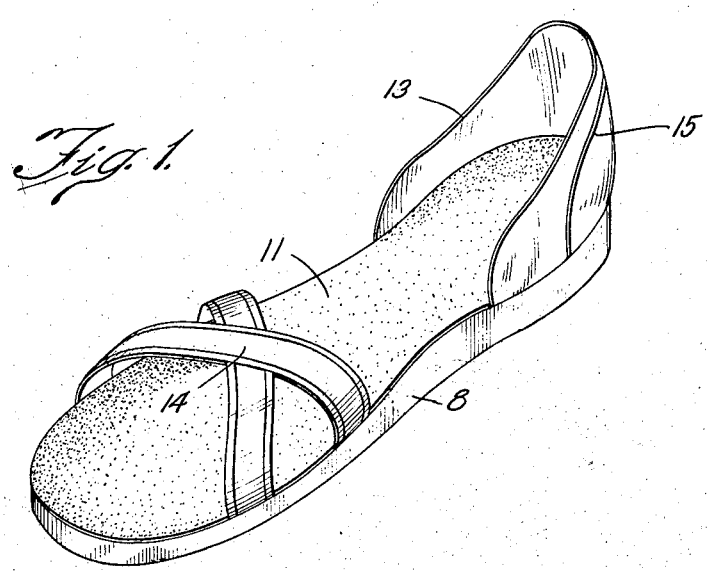
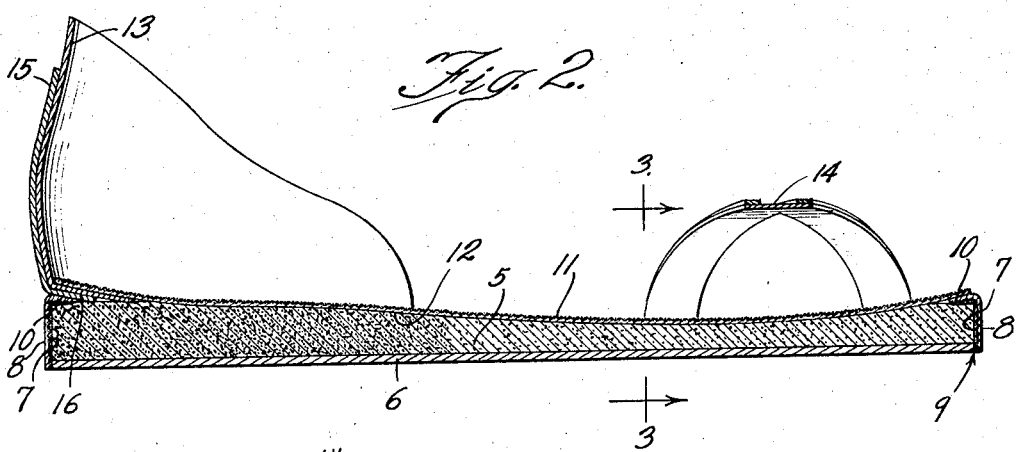
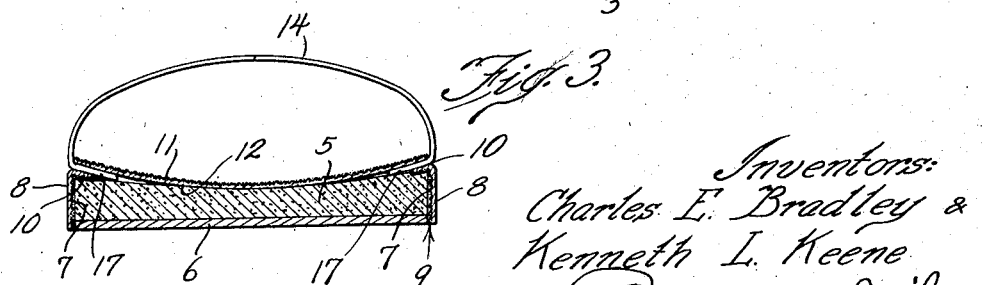

Patented Nov. 16, 1937

2,099,418

UNITED STATES PATENT OFFICE 2,099,418

WATERPROOF BATHING SANDAL

Charles E. Bradley and Kenneth L. Keene, Mishawaka, Ind., assignors to Mishawaka Rubber and Woolen Manufacturing Company, Mishawaka, Ind., a corporation of Indiana Application May 8, 1933, Serial No. 669,862

3 Claims. (Cl. 36—11.5)

Our invention relates to shoes or footwear with soles of sponge rubber and has reference more particularly to an improved sponge rubber sole structure and method of incorporating same in a shoe.

In the manufacture of footwear with sponge rubber soles, it is desirable to seal the sponge rubber so that moisture is excluded from the interior thereof and the sponge rubber should be securely bonded to and combined with the other sole parts into a substantially integral or unitary structure. Moreover, it is important to effect the sponging in a manner to insure uniformity of the soles and to avoid distortion thereof due to irregular sponging. It is also desirable to vary the density of the sponge rubber so that it is more resistant to compression at the places where pressure is concentrated thereon.

The principal objects of our invention are to provide an improved sponge rubber sole having the characteristics mentioned above and to provide an improved method of making and attaching sponge rubber soles,—these and other objects being attained in the manner hereinafter described, reference being had to the accompanying drawing in which, Fig. 1 is a perspective view of a sandal type of shoe constructed in accordance with my invention;

Fig. 2 is a vertical section taken lengthwise of the shoe of Fig. 1, and

Fig. 3 is a transverse section on the line 3—3 of Fig. 2.

Referring to the drawing, the reference numeral 5 indicates the body of the sole, said body being of sponge rubber which is preferably of greater density at the rear end portion where the heel rests thereon. A tread layer 6 of suitable rubber stock having adequate wear resisting properties is secured to the bottom face of the sponge rubber body 5 and the edges of the sponge rubber body 5 are covered and sealed by a facing strip or foxing which consists of friction tape 7 with a layer 8 of rubber on the outer side. This facing strip or foxing 7—8 extends down to the bottom face of the tread layer 6 and is secured to the edges thereof as at 9 and the upper edge of the said facing strip is turned in over and secured to the top of the sponge rubber body 5 as at 10, all as shown particularly in Figs. 2 and 3.

An insole 11, which is preferably of a non-absorbent fabric or similar material, is rubber coated on the under side, as at 12, and firmly secured to the top face of the sponge rubber body 5 and is of a suitable size to extend outwardly over the inturned edges 10 of the facing strip 7—8.

Various forms of upper may be employed with this sole structure, although it is particularly useful in connection with beach sandals, locker room sandals and the like in which cases the upper is preferably of rubber and of a sort of skeleton form, as for example in the illustrated locker room sandal in which there is merely a heel engaging portion 13 extending upwardly around the heel portion of the sole and an open cross strap member 14 located at the forward portion of the sole, the said cross strap member 14 being suitably located and engaging the foot in such a manner and the sole structure having sufficient stiffness so that the heel portion of the shoe does not drop away from the foot.

The heel engaging portion 13 is preferably stiffened by an extra thickness of rubber as at 15 which may be conveniently accomplished by applying an extra layer of rubber at this place and the lower edges of these layers 13 and 15 are turned in and secured between the edge of the insole 11 and the inturned edges 10 of the facing strip 7—8, as indicated at 16. Likewise the ends of the strap member 14 are turned in and secured between the edge of the insole and the inturned edge 10 of the facing strip 7—8, as indicated at 17, it being understood that at the places where the parts composing the shoe upper are attached to the sole, a sealed joint is effected by consolidating the inturned rubber edges 16 and 17 of the upper parts with the rubber coating 12 on the bottom of the insole 11 and with the inturned top edge 10 of the facing strip 7—8 while at other places around the sole the rubber coating 12 is consolidated directly with the edge 10 of the facing strip so that a complete sealing is effected entirely around the top of the sole and no water or moisture can enter to the sponge rubber 5 therein.

In making this shoe the sponge rubber body 5 is prepared separately, either with or without the tread layer 6, by vulcanizing in a mold, a suitable quantity of rubber compound, which has a sponging agent, such as bicarbonate of soda, mixed therewith, being placed in the mold and subjected to a suitable temperature for a sufficient length of time to swell the rubber to the form of the mold cavity and produce the desired sponge texture. In practice applicants subject the material for 30 minutes to steam at 50 pounds (300° F.) which expands and cures the rubber to such an extent that practically no further swelling occurs in the subsequent vulcanization of the shoe and the sponge rubber body retains substantially the shape and form of the mold without subsequent deformation or distortion.

Preferably the tread layer or outsole 6 and sponge rubber 5 are vulcanized together in the mold and it is desirable to arrange the sponge rubber compound in the mold so that in the finished sole the sponge rubber is of greater density at the places where weight is concentrated thereon as for example at the heel. This is accomplished by providing increased thickness of sponge rubber compound at the places where increased density is required so that the compound expands to the thickness of the mold chamber at these places before any considerable sponging action takes place.

After the sponge rubber body has been prepared as above described, the facing strip 7—8 of fabric and uncured rubber is cemented onto the edges thereof so that the lower edge of said strip overlaps the edge face of the tread layer or outsole 6 and the upper edge of this facing strip is turned in onto and cemented to the top face of the sponge rubber body 5 as shown and the assembled sole structure is then ready to be applied to the shoe upper.

The shoe upper is prepared with the insole on a last, the insole 11 being placed in position on the last with the rubber coated face of said insole exposed, and the heel member 13—15 and cross strap member 14 are placed in position and lasted over the rubber coated face of the insole, the lasted edges of said members 13—15 and 14 being rolled down firmly. The assembled sponge rubber sole structure is then cemented in place on the exposed rubber coated face of the insole 11 on the last and pressed down firmly throughout its area and around the edges so that it is not only securely united to the insole but also to the lasted edges of the upper parts 13—15 and 14 and to the inturned edge 10 of the foxing 7—8. The completed shoe, while on the last is then set upright on a board or other suitable support and vulcanized in the usual manner of vulcanizing rubber footwear, after which the last is removed from the completed shoe.

While we have shown and described our invention in a preferred form, we are aware that various changes and modifications may be made therein without departing from the principles of our invention, the scope of which is to be determined by the appended claims.

We claim as our invention:

1. In a rubber soled shoe, the combination of an insole and an outsole vulcanized onto the top and bottom respectively of an intermediate sponge rubber body, said body being formed between the heel portions of the insole and outsole of sponge rubber of greater density than the forward portion of said body.

2. A water-proof bathing sandal, comprising a sole-body of sponge rubber, a wear-resisting rubber-stock tread-layer vulcanized upon the bottom of the body of sponge rubber, a non-absorbent foxing covering and having a water tight connection with the peripheral edge of the sponge rubber and having its upper edge turned in across and secured to the top face of the sponge rubber, a non-absorbent insole covering and secured to the top of the sponge rubber and overlapping the inturned portions of the foxing, the insole, foxing and tread-layer being thin and pliable and constituting a non-absorbent envelope snugly enclosing the sponge rubber, said envelope and sponge rubber being vulcanized together and constituting a composite sole having the soft, pliable, and yielding characteristics of the sponge rubber, and a skeleton upper having its lower edge turned in and secured between the edge of the insole and the inturned edges of the foxing, said composite sole and upper being vulcanized to effect a water-tight connection between associated parts.

3. A water-proof bathing sandal comprising a sole body of sponge rubber, a wear-resisting rubber-stock tread-layer upon the bottom of the body of sponge rubber, a non-absorbent foxing covering and having a water tight connection with the peripheral edge of the sponge rubber and having its upper edge turned in across and secured to the top face of the sponge rubber, a non-absorbent insole covering and secured to the top of the sponge rubber and lapping the inturned portions of the foxing, the insole, foxing and tread-layer being thin and pliable and constituting a non-absorbent envelope enclosing the sponge rubber, said envelope and sponge rubber constituting a composite sole having the soft, pliable and yielding characteristics of the sponge rubber, and a skeleton upper comprising a counter and a toe-embracing portion, the counter and the toe-embracing portion each having its lower edge turned in and secured between the edge of the insole and the inturned edges of the foxing, said composite sole and upper being vulcanized to effect a water-tight connection between associated parts.

CHARLES E. BRADLEY.
KENNETH L. KEENE.